UNITED STATES PATENT OFFICE.

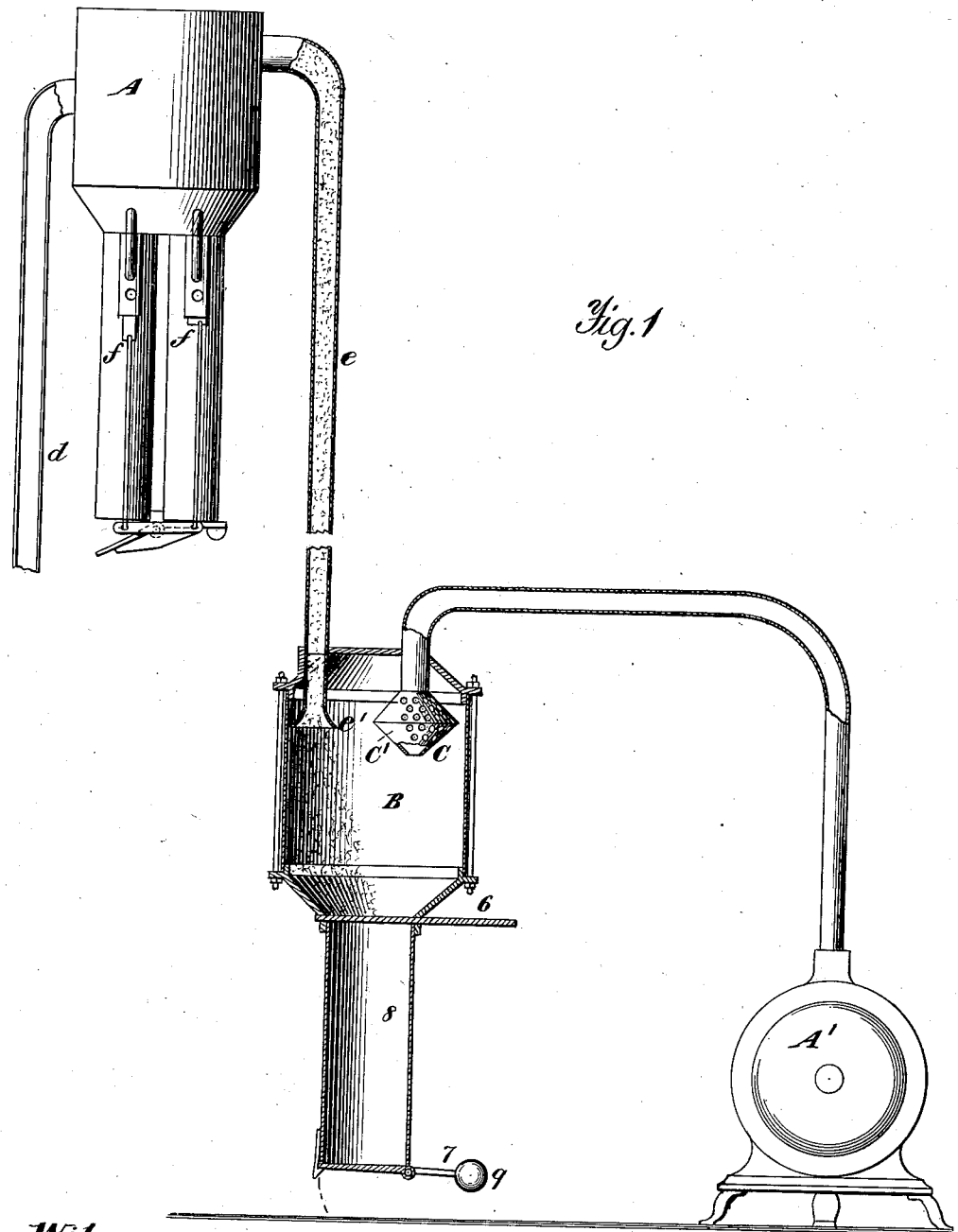

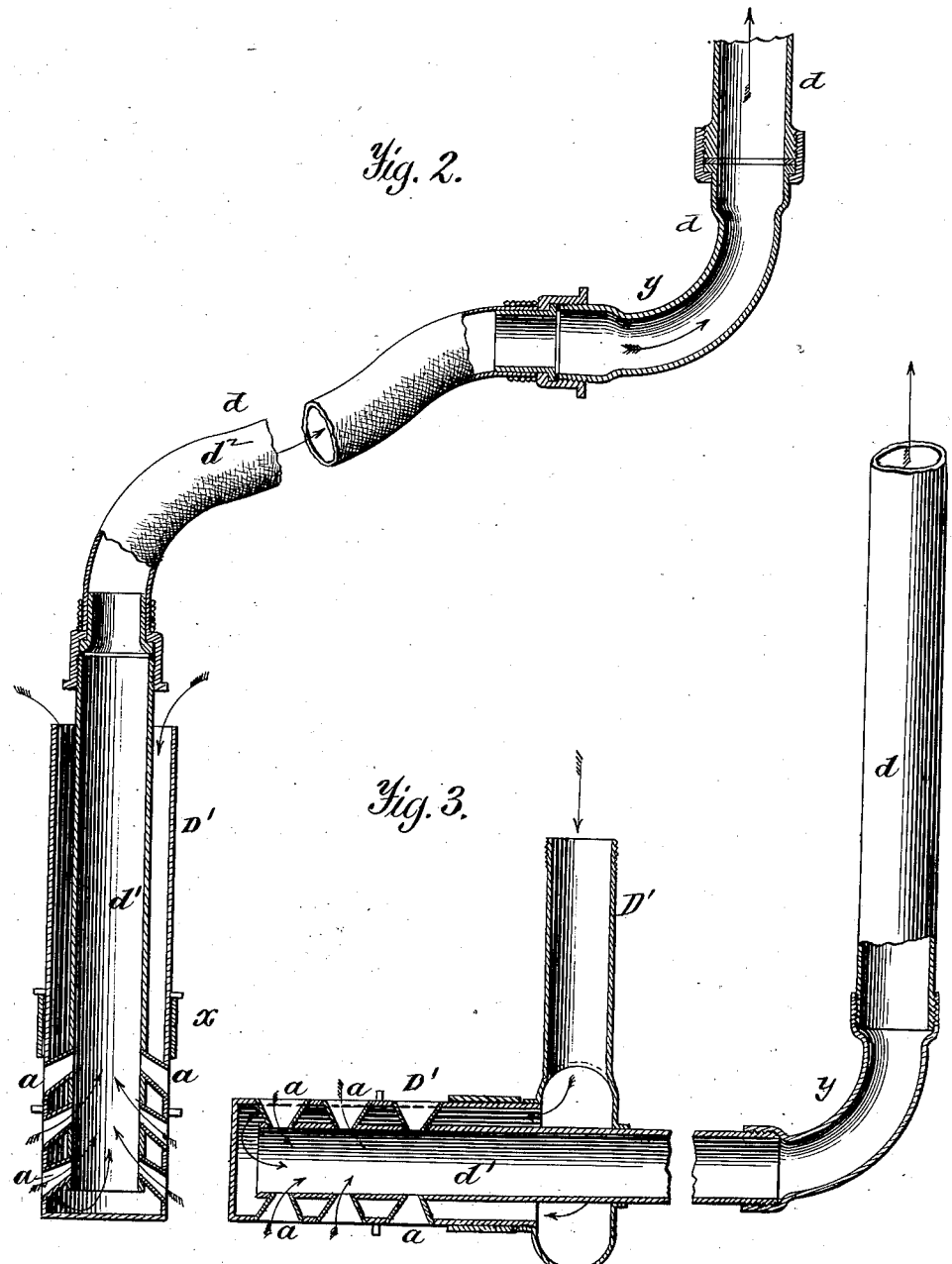

LYMAN SMITH, OF KANSAS CITY, ASSIGNOR TO LYMAN LA RUE SMITH, OF JACKSON COUNTY, MISSOURI.

PNEUMATIC GRAIN-ELEVATOR.

SPECIFICATION forming part of Letters Patent No. 268,303, dated November 28, 1882.

Application filed September 19, 1882. (No model.)

*To all whom it may concern:*

Be it known that I, LYMAN SMITH, of Kansas City, in the county of Jackson and State of Missouri, have invented certain new and useful Improvements in Pneumatic Grain-Elevators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to the class of grain-elevators which is operated by pneumatic process, and is an improvement upon an application now pending, No. 68,486. The elevator is cheap in first cost, simple in construction, economic in its operation, and easily manipulated.

Heretofore in the class of elevators which elevate grain by pneumatic pressure the vacuum has been weakened by the air rushing into the mouth of the delivery-pipe, which is open to the vacuum-chamber and to the atmosphere. The result of this is that the in-rushing air retards the delivery of the grain and at the same time partially destroys the vacuum in the chamber, and therefore weakens the power of the elevator, economically considered a great loss. It is also well known that grain or other material may be readily elevated to any desired height by pneumatic means, but the great difficulty heretofore has been to discharge it without weakening the power of the vacuum and to maintain intact the even working of the apparatus.

To this end my invention consists in the peculiar construction of the suction feed-pipe by which the grain is fed through apertures and the atmospheric air is brought in contact with the grain beneath it, whereby the air-power is utilized, in connection with the blower, in lifting or elevating the grain.

It further consists in interposing a dust-trapping device between the vacuum-chamber and blower, whereby the dust is prevented from passing through the blower, thereby avoiding the usual disadvantages caused to the blower by the grit, dust, chaff, and sand on its working-bearings.

It further consists in the combination, with feed and delivery conduits or pipes, of a flexible hose connected therewith, and joined in such manner that the said conduits may be swiveled around and about to suit the feeding and delivery vessels.

Figure 1 represents a vacuum or lifting chamber, a blower and a dust-trap interposed between said vacuum-chamber and blower, the trap being shown in longitudinal section. Fig. 2 shows a sectional elevation of my improved lifting or elevating pipe with the flexible connections. Fig. 3 shows the lifting or feed pipe in a horizontal position, having an air-supply pipe attachment.

A' is the blower, B' the trap, and A the vacuum-chamber. e is the exhaust-pipe leading from the vacuum-chamber into the dust-trap B', and has at its terminal a flaring mouth, e', for the more ready exit of the dust and air. The trap has also within it a vessel, C', perforated on the side farthest from the inlet-pipe. This vessel is preferably the shape of a double cone, their bases being joined. The object of this contruction is that when the current of air strikes the vessel the air is divided and broken up into jets and compelled to separate from the dust, grit, and other foreign matter held in suspension, that would otherwise be carried over with the current and into the blower. The vessel C' is open at the bottom to permit any dust that might pass through the perforations to fall out. The trap at its outlet or bottom is provided with two valves, 6 and 7, the object being to discharge the contents of the trap, which is done as follows: To prevent the external air from rushing in when the current is passing through the body of the trap, when the discharge-valve 6 is open, I keep closed the valve 7. After the foreign matter has fallen to the bottom of pipe 8 I close valve 6 and open valve 7, when the contents of pipe 8 are discharged. Then valve 6 is again opened. Ordinarily valve 7 will open automatically when the machine is at rest. The weight 9 on valve 7 overbalances the valve, and will close it and keep it closed until the material within overbalances its weight, when it will dump and close again. The valve's cross-head shown on vacuum-chamber is fully described in the application above referred to.

The air-pipe D', closed at its bottom, encircles the mouth piece d' of the grain feed-pipe d, and extends a short distance below the bottom of said piece d', so as to leave an air-inlet space between the bottom of the air-pipe and the mouth-piece d' of the grain feed-pipe d. Extending through the walls of the pipes D' and d' are a series of grain-inlet tubes, a, through which the grain is sucked by the power of the blower. The feed-tube d is connected to the vacuum-chamber, the operation of which is fully set forth in the application referred to. The quantity of grain to be elevated is controlled by a slip-joint thimble-valve or other device, X, which slides on the outside of the air-pipe D' and closes as many of the grain-inlet tubes a as may be desired.

The principle of construction described for Fig. 2 may be applied to the horizontal pipes shown by Fig. 3, only in Fig. 3 the air-pipe D' is at right angles to the mouth-piece of the grain-pipe. This air-pipe has an annular air-chamber of larger diameter than itself, so as to permit an easy and full supply of air. The flexible tubes $d^2$, which connect the mouth-piece $d'$ with the grain-pipe d, are provided with curved sections or elbows y. These flexible tubes $d^2$ are adapted to swivel around to suit the location from where the grain is to be taken and also to be delivered. The bends or elbows y, I make of smaller diameter than the other portion of the pipe d, for the purpose of clearing them by the increased velocity of the grain and air passing through them. Heretofore these bends have been made larger, and usually the same size of the straight pipe; but in these instances the passage of the grain through them was sluggish and frequently choked up. By my improvement I have completely overcome these objections, and produce as free a flow through the bends as through any portion of the conveying-tube.

In operating this apparatus it is well to have the trap as large as possible, so that the current through it will be very slow. In this way the particles of dust, light grain, chaff, or other foreign substances will separate from the air and fall to the bottom of the trap.

The joints in the pipes should be properly packed and jointed, so that they may be air-tight.

Any suitable pipe-coupling may be employed on the conveying-tubes.

These attachments for elevators may be applied to any of the elevators now in use.

It is not intended to confine my device to the use of grain alone, as it is obvious that the elevator and its attachments may be employed to elevate any material capable of being raised by pneumatic pressure.

The attachments may be made of any suitable material and of any suitable shape or design.

Having thus described my invention and the method of carrying the same into effect, what I claim as new, and desire to secure by Letters Patent, is—

1. The combination, in a pneumatic grain-elevator, of the vacuum-chamber and a blower with a dust trap arranged, in connection with the exhaust-pipe, between the vacuum-chamber and blower, the trap being provided with a dust-separating device.

2. The combination, in a pneumatic elevator, of the vacuum-chamber, the blower, the trap arranged between the said blower and chamber, said trap being provided with valves for discharging its contents without interfering with the air-current passing through the trap.

3. The combination, in a pneumatic elevator, of the vacuum-chamber, the blower, and trap interposed between the blower and chamber, and in communication therewith, the said trap being provided with a separating device and discharge-valves.

4. The combination, with the suction feed-pipe of a pneumatic grain-elevator, of the mouth-piece having an outer air-supply pipe closed at its bottom and open at its top, the said outer pipe being sufficiently below the mouth-piece of the grain-pipe to permit the air to be sucked in below the grain, thereby utilizing its power, said pipes having grain-inlet apertures.

5. The combination, in a grain-elevator, of the air-supply pipe, the mouth-piece of the grain-supply pipe with a grain-controlling valve or thimble for graduating the grain-supply to the mouth-piece of the supply or feed pipe.

6. The combination, in a grain-elevator, of the air-inlet pipe, the grain-inlet tubes or apertures, the grain-supply-controlling device, the grain-tube d, flexible tube $d^2$, and non-flexible tube y, having a contracted part or parts intermediate its length, for the purpose specified.

7. A pneumatic tube consisting of straight and bent sections, the latter being contracted for the purpose of increasing the velocity of the contents of the tubes passing through them.

8. The combination, in a grain-elevator, of the air-supply pipe, the mouth-piece of the grain-elevating pipe, the latter being connected to the former by grain-inlet tubes, with a grain-supply-controlling device.

9. The combination, in a grain-elevator, of the air-tube D', the grain-inlet tubes a, the mouth-piece d', the grain-supply-controlling device X, a suction feed-pipe, d, consisting of a flexible portion and a non-flexible contracted portion, the latter for increasing the velocity of the substance passing through the tubes.

10. The combination, with a vacuum chamber or receiver, of a separating trap or device interposed between the vacuum chamber or receiver and the blower or exhausting mechanism and said mechanism.

11. The method of separating extraneous matter from cereals while being elevated by pneumatic process, the same consisting in conducting the foreign matter from a compartment into which the cereals have been received into a trap or device, thence separating the air from the foreign matter and preventing the latter from entering the blower or exhauster.

In testimony that I claim the foregoing as my own I hereunto affix my signature in presence of two witnesses.

LYMAN SMITH.

Witnesses:
B. F. MORSELL,
O. E. DUFFY.